(12) United States Patent
Astarabadi et al.

(10) Patent No.: US 9,542,195 B1
(45) Date of Patent: Jan. 10, 2017

(54) MOTHERBOARDS AND METHODS FOR BIOS FAILOVER USING A FIRST BIOS CHIP AND A SECOND BIOS CHIP

(71) Applicant: Western Digital Technologies, Inc., Irvine, CA (US)

(72) Inventors: Shaun Astarabadi, Laguna Niguel, CA (US); Cass E. Cunningham, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 415 days.

(21) Appl. No.: 14/023,402

(22) Filed: Sep. 10, 2013

Related U.S. Application Data

(60) Provisional application No. 61/859,751, filed on Jul. 29, 2013.

(51) Int. Cl.
   *G06F 9/44* (2006.01)
   *G06F 11/14* (2006.01)
(52) U.S. Cl.
   CPC ........... *G06F 9/4401* (2013.01); *G06F 9/4411* (2013.01); *G06F 11/1469* (2013.01)
(58) Field of Classification Search
   CPC ................. G06F 9/4401; G06F 11/1417; G06F 11/14691; G06F 11/1469
   USPC ............................................. 713/2; 714/6.3
   See application file for complete search history.

(56) References Cited

U.S. PATENT DOCUMENTS

| | | | | |
|---|---|---|---|---|
| 6,651,188 B2 * | 11/2003 | Harding et al. | ..... | G06F 11/1417 714/38 |
| 6,757,838 B1 * | 6/2004 | Chaiken | ................ | G06F 9/4403 714/15 |
| 8,086,841 B2 | 12/2011 | Guo et al. | | |
| 8,341,390 B2 | 12/2012 | Watanabe | | |
| 8,443,234 B2 | 5/2013 | Chen et al. | | |
| 2003/0079007 A1 * | 4/2003 | Merkin | ................ | G06F 11/0745 709/223 |
| 2004/0003226 A1 * | 1/2004 | Collins | ................ | G06F 11/1417 713/2 |
| 2004/0153724 A1 * | 8/2004 | Nicholson | ........... | G06F 11/0709 714/6.11 |
| 2005/0273588 A1 * | 12/2005 | Ong | ..................... | G06F 11/1417 713/2 |
| 2006/0236150 A1 * | 10/2006 | Lintz, Jr. | .............. | G06F 11/1417 714/6.13 |
| 2007/0150651 A1 | 6/2007 | Nemiroff et al. | | |
| 2008/0141016 A1 * | 6/2008 | Chang | ................. | G06F 11/1433 713/2 |

(Continued)

*Primary Examiner* — Chun Cao (57) ABSTRACT

Systems and methods for BIOS failover. A processor reset is detected and a timer is set to expire after a predetermined time corresponding to a time to complete loading a first BIOS image from a first BIOS chip. Loading of the first BIOS image is initiated and it is determined whether the first BIOS image loaded successfully before the timer expired. If the timer expires before the first BIOS image is loaded successfully, loading is switched to a second BIOS image from a second BIOS chip. According to another aspect, loading of a first BIOS image from a first BIOS chip is initiated and a reset of a processor is detected. A reset counter is incremented in response to detecting a reset of the processor and loading is switched to a second BIOS image from a second BIOS chip when the reset counter reaches a reset threshold.

26 Claims, 8 Drawing Sheets

(56) References Cited

U.S. PATENT DOCUMENTS

| | | | |
|---|---|---|---|
| 2008/0229158 A1* | 9/2008 | Saito | G06F 11/1417 |
| | | | 714/55 |
| 2008/0288767 A1 | 11/2008 | Wang et al. | |
| 2009/0063834 A1* | 3/2009 | Huang | G06F 9/4401 |
| | | | 713/2 |
| 2009/0158024 A1 | 6/2009 | Hung et al. | |
| 2010/0100720 A1* | 4/2010 | Wu | G06F 11/1417 |
| | | | 713/2 |
| 2010/0250910 A1 | 9/2010 | Watanabe | |
| 2012/0011393 A1* | 1/2012 | Roberts | G06F 11/1417 |
| | | | 714/6.3 |
| 2012/0239920 A1 | 9/2012 | Yang | |

* cited by examiner

MOTHERBOARDS AND METHODS FOR BIOS FAILOVER USING A FIRST BIOS CHIP AND A SECOND BIOS CHIP

CROSS-REFERENCE TO RELATED APPLICATION(S)

This application claims the benefit of U.S. Provisional Application No. 61/859,751, filed on Jul. 29, 2013, which is hereby incorporated by reference in its entirety.

BACKGROUND

A PC system architecture normally uses a basic input/output (I/O) system (BIOS) as a boot loader. The BIOS image is typically stored on a BIOS flash chip, which may be a flash memory or electrically erasable programmable read only memory (EEPROM). The BIOS image may include a BIOS firmware as well as machine specific data values stored in a non-volatile random access memory (NVRAM). Conventionally, the PC system stores only one copy of the BIOS image. The BIOS is generally the first code loaded and executed by the PC system and can be used to load an operating system (OS) of the PC system.

The BIOS image may become corrupted if an update process, which may include an erase step, is interrupted. The PC system may then not be able to boot, thereby disabling the PC system and preventing access to files to restore the BIOS image. The BIOS flash chip may then be physically replaced to restore the BIOS image, but physically replacing the BIOS flash chip may not be a feasible option, because of the added cost and greater chance of mechanical failures.

BRIEF DESCRIPTIONS OF THE DRAWINGS

The features and advantages of the implementations of the present disclosure will become more apparent from the detailed description set forth below when taken in conjunction with the drawings. The drawings and the associated descriptions are provided to illustrate implementations of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

While the description herein refers generally to a NAND flash memory, it is understood that other implementations can include one or more of various types of solid state memory such as Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete non-volatile memory (NVM) chips, or any combination thereof.

Figure 1A:
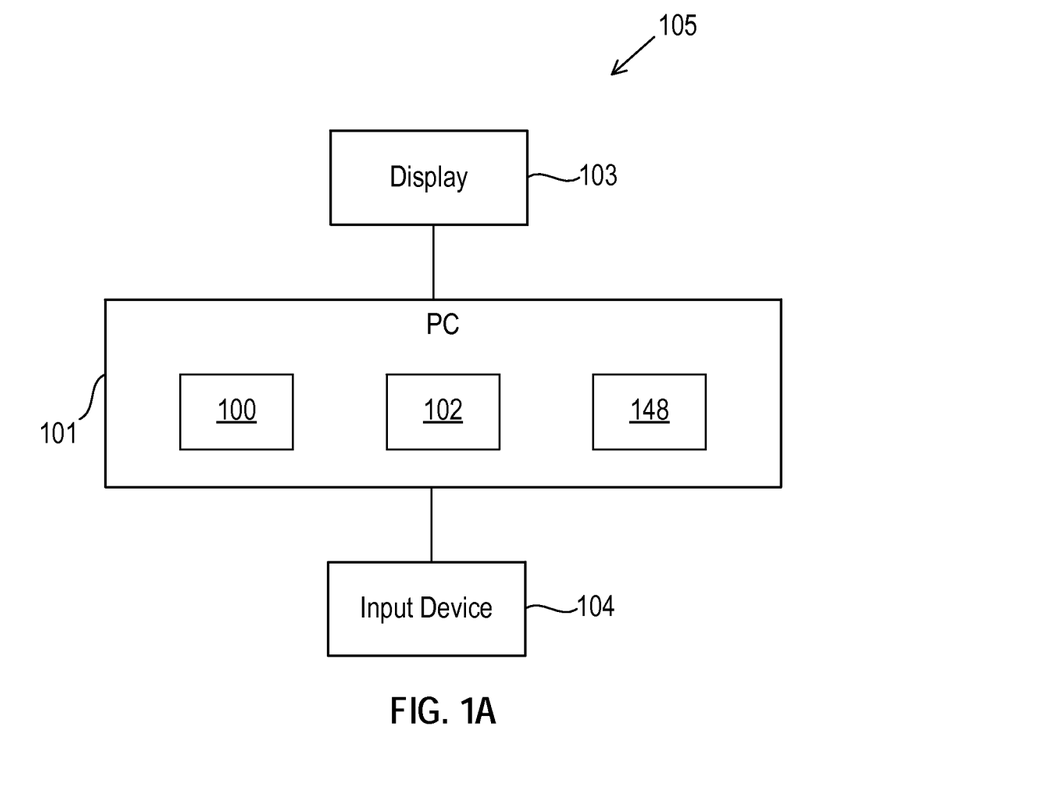
FIG. 1A is a block diagram of a computer system having a motherboard according to an implementation of the present disclosure.

FIG. 1A presents a block diagram of a computer system 105 according to one implementation of the present application. The computer system 105 includes a PC 101, a display 103, and an input device 104. The display 103 may be any suitable display, such as a monitor, a television, a touchscreen, or other similar device. The input device 104 may be one or more input devices, such as a keyboard, a mouse, a touchscreen, or other similar device.

The PC 101 includes a motherboard 100, a data storage device (DSD) 102, and off-board devices 148. The DSD 102 may be any suitable storage device, such as a hard disk drive (HDD), solid state disk drive (SSD), solid state hybrid drive (SSHD), a flash drive, or other similar device. The off-board devices 148 include peripheral devices which are not a part of the motherboard 100. The motherboard 100 is an exemplary implementation of the present disclosure.

Figure 1B:
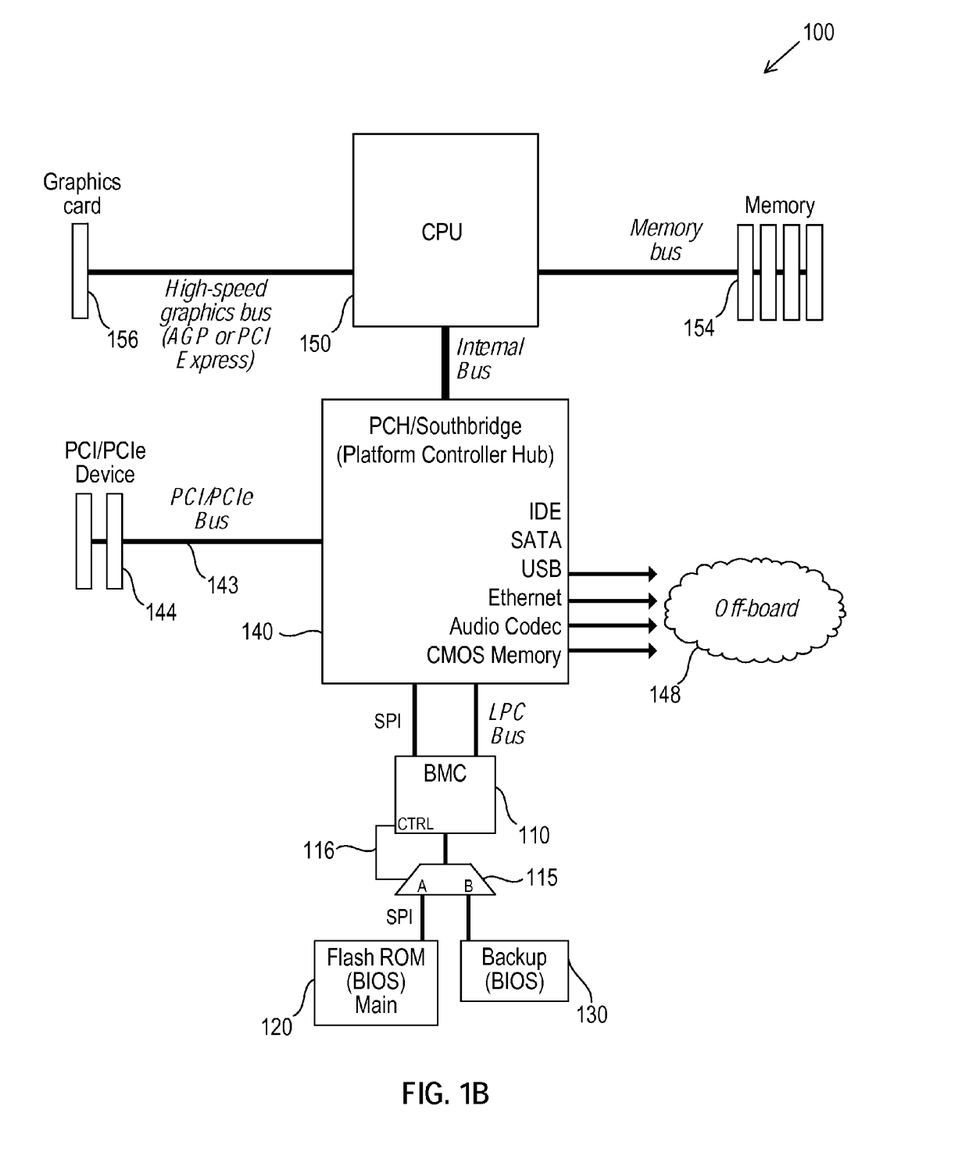
FIG. 1B is a block diagram of a motherboard according to an implementation of the present disclosure.

FIG. 1B presents a block diagram of the motherboard 100. The motherboard 100 includes a central processing unit (CPU) 150 connected to a platform controller hub (PCH) or southbridge 140. The CPU 150 is connected to a memory 154, and a graphics card 156. The southbridge 140 connects a peripheral component interconnect (PCI) or PCI Express (PCIe) device 144 through a PCI or PCIe bus 143, the off-board devices 148, a super I/O 146, a board management controller (BMC) 110, a multiplexer (mux) 115, a main BIOS 120, and a backup BIOS 130. Although the implementation of FIG. 1B refers to PCI/PCIe, those of ordinary skill in the art will appreciate that other bus protocols may be used in different implementations.

The CPU 150 may be a chip having various functions from multiple chipsets integrated into one chip, such as an additional CPU chip or core integrated into or running parallel with the CPU 150. The CPU 150 may further include or perform the operations of a clock generator and a northbridge. In conventional motherboard designs, a northbridge can serve as a memory controller hub, handling "fast" communications between the CPU 150 and the graphics card 156 and the memory 154. To reduce motherboard cost and improve performance, the northbridge can be integrated with the CPU 150.

The southbridge 140, also known as a Platform Controller Hub (PCH) 140, generally manages slower capabilities of the motherboard 100, including I/O functions through the PCIe device 144, the off-board devices 148, and the super I/O 146, and system BIOS functions through the main BIOS 120, the backup BIOS 130, and the BMC 110.

The components of the motherboard 100 generally correspond and function similar to the components of a conventional motherboard. However, unlike a conventional motherboard, the motherboard 100 includes two flash ROMs, the main BIOS 120 and the backup BIOS 130. The main BIOS 120 and the backup BIOS 130 comprise BIOS flash chips configured to store BIOS images. Rather than storing a backup BIOS image in the same memory chip as the main BIOS image, some embodiments utilize two BIOS flash chips. The BMC 110 may be a BMC as known in the art, or may be a microcontroller. The BMC 110 can control communication between the PCH 140 and the main BIOS 120 and the backup BIOS 130. By sending a signal 116 to the mux 115, the BMC 110 can switch booting between the main BIOS 120 and the backup BIOS 130 transparently such that the PCH 140 and the CPU 150 are aware of only a single BIOS flash chip. For example, the PCH 140 sees only a single BIOS flash chip directly connected on the SPI connection. The LPC bus may be used for communication between the PCH 140 and the BMC 110.

Although the motherboard 100 is shown having the CPU 150 and the PCH 140, in other implementations, the motherboard 100 may comprise a different number of controller hubs in different arrangements. For example, a northbridge may be implemented as a separate chipset from the CPU 150. Alternatively, the northbridge and the southbridge 140 may be integrated into a single chipset with the CPU 150, or implemented as alternative chipsets handling different functions.

The main BIOS 120 stores code, such as a firmware, for a start-up program. When the motherboard 100 (i.e. a device having the motherboard 100) starts up, the start-up program in the main BIOS 120 executes.

The start-up program may execute a power-on self-test (POST) to check and initialize required devices. When the start-up program is complete, but prior to the operating system (OS) loading, the main BIOS 120 asserts the PCH 140 to send a handshake signal, such as a BIOS_OK signal, to the BMC 110, indicating BIOS integrity.

The start-up program of the main BIOS 120 may also execute when the CPU 150 is reset. When the CPU 150 is reset, a CPU reset signal, such as an SLP_S3# signal, may be sent to the BMC 110. In addition, the PCH 140 may reset the PCI bus 143. The BMC 110 may also have control over a PCI/PCIe reset signal.

Because the BIOS firmware loads first, and is used to load the operating system, corruption in the BIOS firmware can render the system inoperable. The BIOS firmware may be corrupted from a failed update process, such as being interrupted while flashing a new image, or may be corrupted due to physical damage, requiring removal and replacement of the BIOS flash chip. Because the system cannot boot with a corrupted BIOS, repairing the corrupted BIOS often requires physical replacement of the BIOS flash chip, which may require de-soldering if the BIOS flash chip is not socketed.

The backup BIOS 130 stores a factory-set image and may not be updated to ensure integrity of the backup. The need for replacing the main BIOS 120 can ordinarily be reduced because the BMC 110 can degrade (i.e. switch) to the backup BIOS 130 if the main BIOS 120 fails for any reason, and the backup BIOS 130 can be used to repair or restore the image on the main BIOS 120. As such, the main BIOS 120 may be soldered onto the motherboard 100, providing greater mechanical reliability than a socketed chip since a socketed chip may fail due to vibration or improper component insertion.

Although the present disclosure references BIOS, in other implementations other boot loaders, such as U-Boot may be stored on the main BIOS 120 and the backup BIOS 130.

The BMC 110 may perform one or more automatic fail-safe procedures when a BIOS failover occurs, as will be described below.

Figure 2:
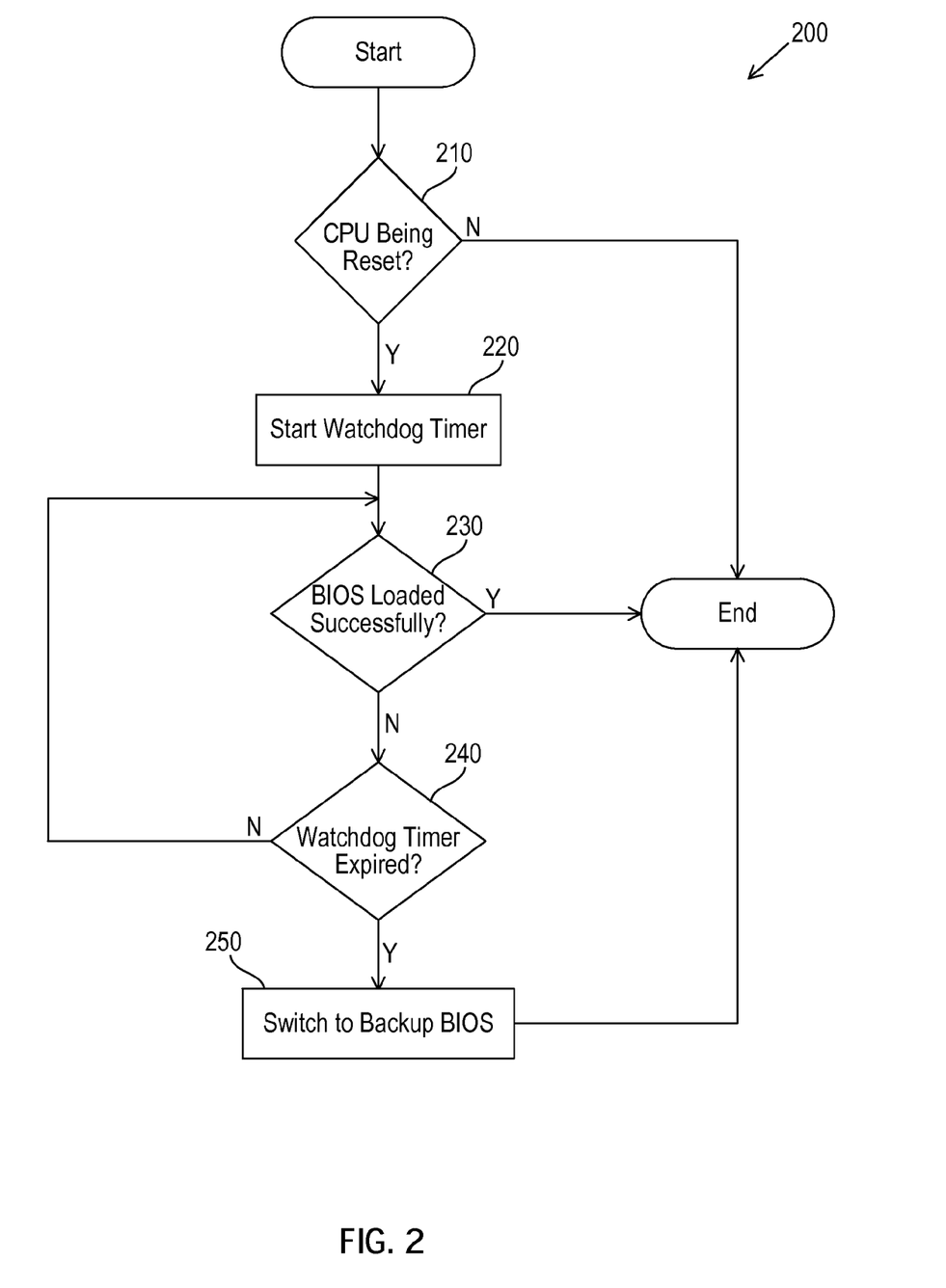
FIG. 2 is a flowchart of a BIOS failover process according to an implementation of the present disclosure.

FIG. 2 presents a flowchart 200 of a watchdog timer method according to an implementation of the present application. At 210, the BMC 110 checks whether the CPU 150 is being reset. For example, the BMC 110 may detect a rising edge of the SLP_S3# signal. If the CPU 150 was reset, then at 220 the BMC 110 starts a watchdog timer. The watchdog timer may be set to a predetermined time corresponding to a time required for successfully loading the BIOS, and may further include an additional buffer time. The expiration of the watchdog timer may indicate a corrupt BIOS image because the BIOS failed to load in the normal amount of time. Alternatively, the watchdog timer may track the amount of time elapsed, such that when the timer reaches the predetermined time, the BMC 110 determines that the BIOS failed to load successfully.

The BIOS loads from the main BIOS 120. At 230, the BMC 110 determines whether the BIOS was loaded successfully. The BIOS may self-check critical code sections, such as through a CRC or checksum, or may reach a predetermined point prior to loading the OS before the PCH 140 asserts a BIOS_OK or other similar signal indicating BIOS integrity.

If the BIOS was loaded successfully, the BMC 110 stops the watchdog timer and the system continues booting normally. However, if the BIOS has not yet loaded successfully, at 240 the BMC 110 determines whether the watchdog timer expired. If the watchdog timer has not expired, the BMC 110 continues to check the BIOS_OK signal until the watchdog timer expires, repeating 230 and 240. If the BIOS_OK is not asserted before the watchdog timer expires, at 250 the BMC 110 switches to the backup BIOS 130. In other words, upon the next boot, the BMC 110 will load the BIOS firmware from the backup BIOS 130 rather than the main BIOS 120. Bypassing the main BIOS 120 is transparent to the system. The BMC 110 may force a reset of the system for another boot attempt. Alternatively, the PCH 140 may reset the CPU 150. In other words, the BMC 110 can manage the status of which BIOS is in use. For instance, the BMC 110 may store a flag indicating whether the main BIOS 120 or the backup BIOS 130 is being used or loaded.

Figure 3:
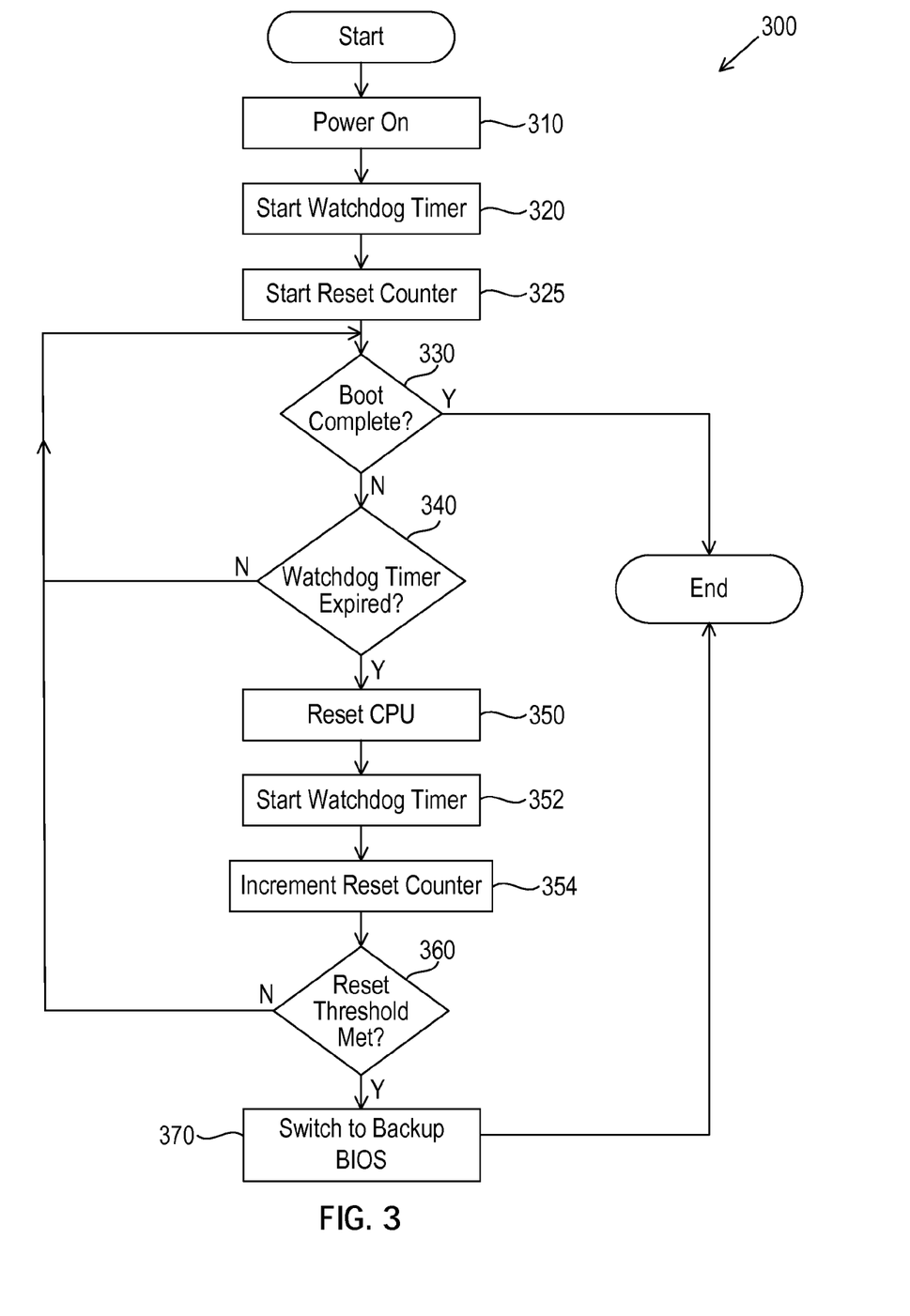
FIG. 3 is a flowchart of a BIOS failover process according to an implementation of the present disclosure.

FIG. 3 presents a flowchart 300 of a CPU reset counter method according to an implementation of the present application in which the BMC 110 can utilize a watchdog timer started by the PCH 140. Briefly, the PCH 140 can start the watchdog timer when it releases a reset signal to the CPU 150 and the timer can be cleared when the BIOS sets a boot complete bit in the PCH 140. Otherwise, when the timer expires, by either timing out or by tracking elapsed time and reaching the predetermined time, the PCH 140 tries the CPU reset again. The BMC 110 may keep a counter of CPU resets to determine a failed BIOS. The counter may start at 0 and track the number of CPU resets, or may start at a reset threshold and count down to 0.

In more detail, the PC 101 powers on at 310, which may involve the CPU 150 being reset by the PCH 140. At 320, the PCH 140 starts a watchdog timer. At 325, the BMC 110 starts a reset counter and the BIOS attempts to load and execute from the main BIOS 120.

At 330, the BMC 110 determines whether the boot was completed. If the BIOS successfully loaded, the BIOS sets the boot complete bit, the watchdog timer and the reset counter are reset, and the system continues booting. However, if the boot complete bit is not set, then at 340 the BMC 110 determines whether the PCH watchdog timer expired. If it has not expired, the BMC 110 repeats 330 and 340 until either the boot completes or the PCH watchdog timer expires.

If the PCH watchdog timer expired, then at 350 the PCH 140 resets the CPU 150. In addition, at 352, the PCH 140 starts or resets/restarts the PCH watchdog timer. At 354, the BMC 110 increments the reset counter.

At 360, the BMC 110 determines whether the reset threshold is met. During normal operation, the CPU 150 may reset multiple times under certain circumstances. For instance, the CPU 150 may be reset while flashing the main BIOS 120. Therefore, the reset threshold may be higher than the number of resets expected under normal operation.

If the reset threshold is not met, the process returns to 330. If the reset threshold is met, indicating a corrupted BIOS image in the main BIOS 120, the BMC 110 at 370 switches to the backup BIOS 130, such that the BIOS image from the backup BIOS 130 is loaded upon the next boot. The PCH watchdog timer and the reset counter are reset and the system may reboot. The BMC 110 further keeps track of which BIOS flash chip is being used.

Figure 4:
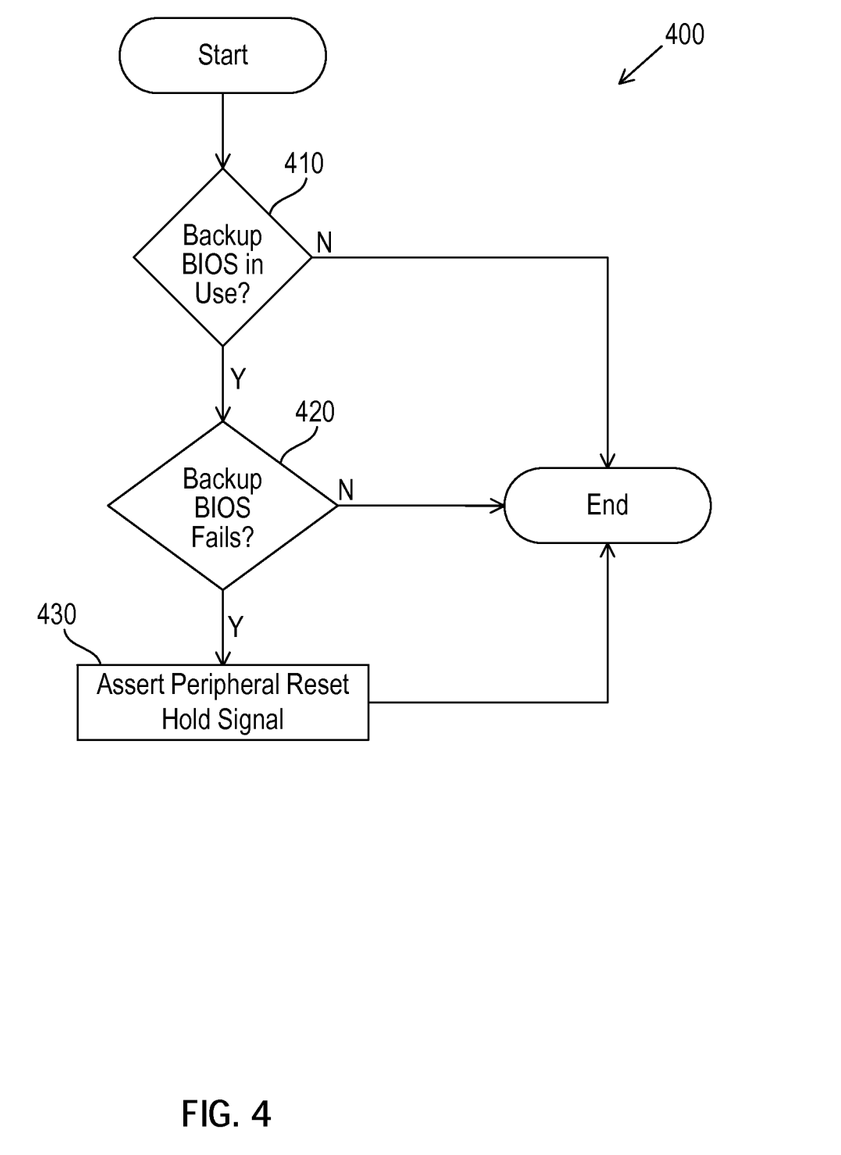
FIG. 4 is a flowchart of a backplane device protection process according to an implementation of the present disclosure.

FIG. 4 presents a flowchart 400 of a backplane device protection method according to an implementation of the present application. When the BIOS fails loading, e.g. when the PCH watchdog timer expires, the PCH 140 may reset the PCIe bus 143. However, a corrupted BIOS may cause repeated resets of the PCIe bus 143, which may damage PCIe devices such as the PCIe device 144 that are connected to the PCIe bus 143.

At 410, the BMC 110 determines whether the backup BIOS 130 is in use. For example, the BMC 110 may have switched to the backup BIOS 130 as a result of either of the processes of FIG. 2 or 3. If the backup BIOS 130 is not in use, there is a reduced likelihood of the PCIe bus 143 being repeatedly reset, and the process ends.

If the backup BIOS 130 is in use, the BMC 110 determines if the backup BIOS 130 has failed. For instance, the BMC 110 may perform 210-240 of FIG. 2 or 310-360 of FIG. 3 to determine failure. If the backup BIOS 130 has not failed, the process ends as there is a reduced likelihood of the PCIe bus 143 being repeatedly reset.

If the backup BIOS 130 has failed, then at 430 the BMC 110 asserts a peripheral reset hold signal. The peripheral reset hold signal prevents the PCH 140 from repeatedly resetting the PCIe bus 143. In one implementation, the peripheral reset hold signal can be a PCIe reset signal that indicates to the PCH 140 that the PCIe bus 143 has been reset. The BMC 110 may then hold the PCIe reset signal asserted to prevent the PCH 140 from repeatedly resetting the PCIe bus 143.

Because the backup BIOS 130 provides a more reliable backup for the main BIOS 120 than a backup image stored in the main BIOS 120, the main BIOS 120 may be flashed more often. The backup BIOS 130 is generally not updated, although in certain implementations the backup BIOS 130 may be updated. The main BIOS 120 may be flashed and reflashed without modifying the backup BIOS 130.

Because the main BIOS 120 may be flashed with less chance of rendering the system unbootable, automatic image update features may be safely implemented. New image (i.e. firmware) version updates may be downloaded or otherwise acquired from the field and flashed to the main BIOS 120, whether manually or automatically. Flashing the main BIOS 120 becomes a repeatable, generally fail-safe operation that can be automatic or field programmed without the need for user intervention. The main BIOS 120 may be recovered from a corrupted image without having to physically replace the main BIOS 120. The system can still boot from the backup BIOS 130 to allow non-volatile random access memory (NVRAM) values holding information specific to each device and stored in the main BIOS 120 and the backup BIOS 130 to be restored. The BIOS image may also be replicated from the backup BIOS 130 to recover the main BIOS 120.

Figure 5:
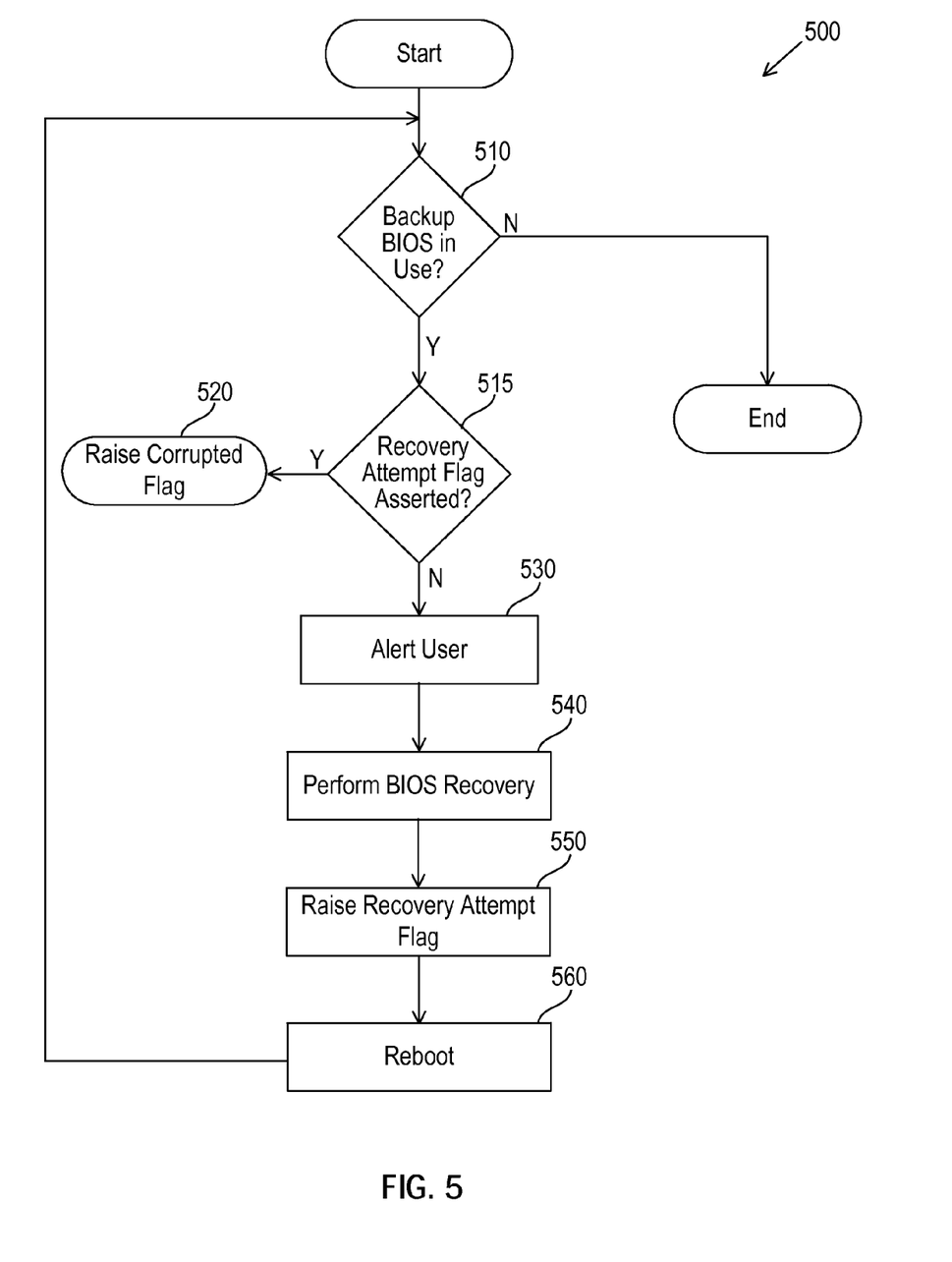
FIG. 5 is a flowchart of a BIOS recovery process according to an implementation of the present disclosure.

FIG. 5 presents a flowchart 500 of a BIOS image update method according to an implementation of the present application. Once the system is booted, at 510 an update service, which may be executed by the CPU 150 executing instructions from the OS stored on the PC 101, determines whether the backup BIOS 130 is in use. The BMC 110 may alert the update service as to which BIOS flash chip is active. If the backup BIOS 130 is not in use, the update service may clear a recovery attempt flag and end execution. Alternatively, the update service may continue to run, for example as part of an automated update process. In other implementations, the update service may check to see if a degraded flag was asserted, which indicates that the main BIOS 120 was degraded.

At 515, the service checks if the recovery attempt flag was asserted. The recovery attempt flag is a persistent flag which does not get cleared upon a system reboot. The recovery attempt flag is raised if the service previously attempted a BIOS recovery operation. If at 510 the backup BIOS 130 is not in use, the recovery attempt flag is cleared, meaning the prior recovery attempt was successful. However, if at 515 the recovery attempt flag was already asserted, the service raises a corrupted flag and ends execution. The corrupted flag indicates that the main BIOS 120 is corrupted and not recoverable. The service may assume that after one recovery operation, if the backup BIOS 130 is still in use, then the main BIOS 120 cannot be recovered.

At 530, the user may optionally be alerted as to a failure of the main BIOS 120. The user may be prompted with a choice of actions to take, such as automatic recovery, manual recovery, or take no action.

At 540, a BIOS recovery is performed. The main BIOS 120 is reflashed with a stable or non-corrupted image from a confirmed external source, such as an updated image downloaded by the PC system from a verified source or loaded from a removable media. The main BIOS 120 can also be reflashed with a factory set image from the backup BIOS 130.

At 540, data values in an NVRAM may optionally be restored. The NVRAM data may be, for example, factory programmed values specific to the product line or device, such as a number of bays in a unit or a serial number. These values may be read from a verified non-corrupt source, such as a BIOS image from a confirmed external source or the backup BIOS 130, and inserted into the updated image. Alternatively, the NVRAM data values may not be overwritten when the main BIOS 120 is reflashed, in order to preserve the NVRAM data values.

At 550, the recovery attempt flag is raised. At 560, the PC 101 is rebooted, with the recovery attempt flag persistent. If the recovery attempt was successful, then at 510 the backup BIOS 130 would not be in use, and the service would clear the recovery attempt flag and end. Otherwise, at 515, because the recovery attempt failed, the service raises the corrupted flag at 520 and ends. The service may no longer run if the corrupted flag is raised, which is also persistent.

Figure 6:
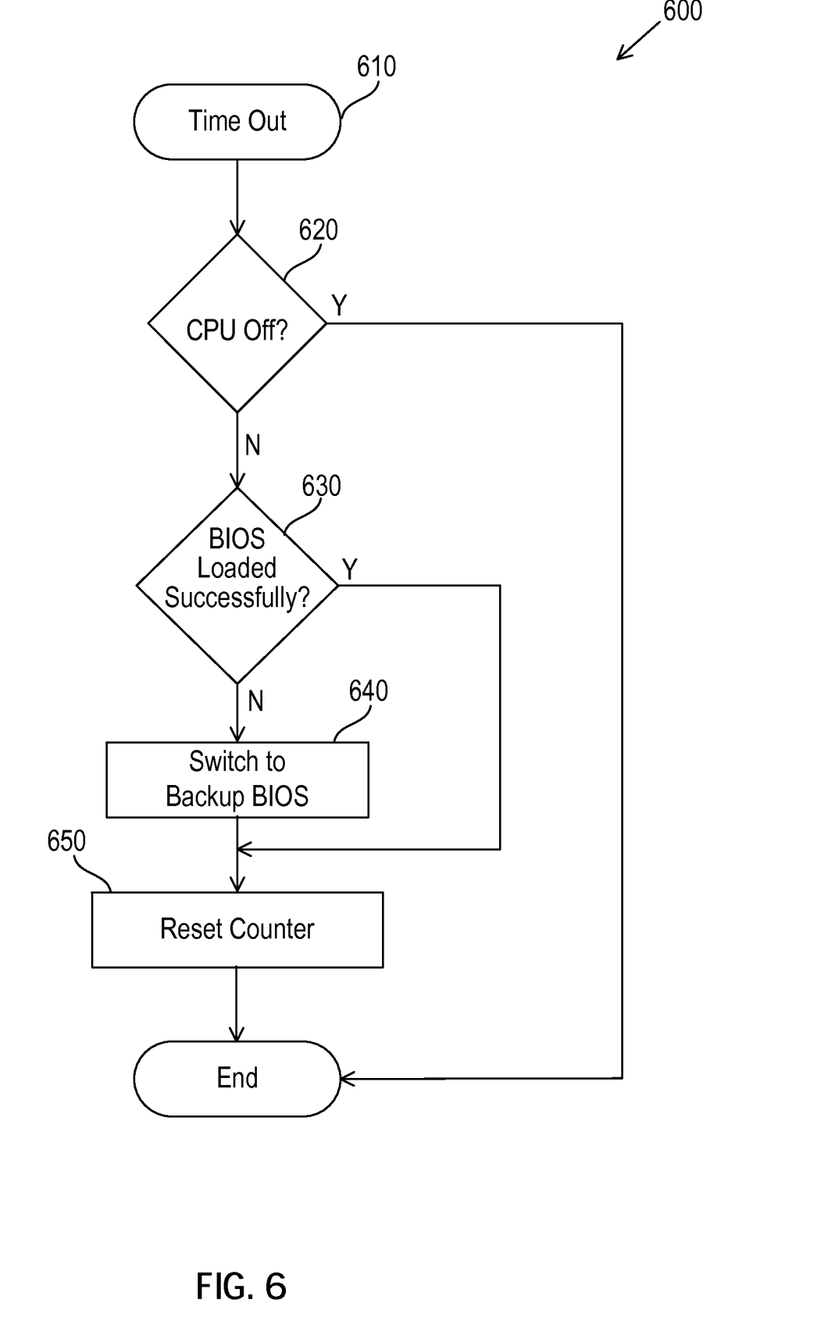
FIG. 6 is a flowchart of an interrupt driven BIOS failover process according to an implementation of the present disclosure.
Figure 7:
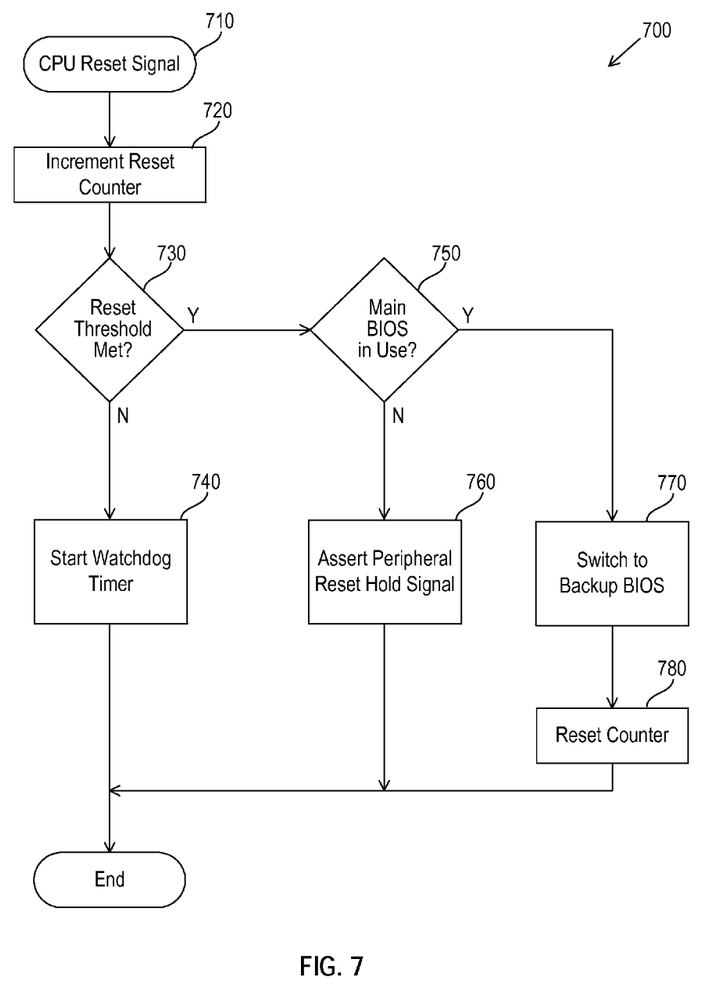
FIG. 7 is a flowchart of an interrupt driven BIOS failover process according to another implementation of the present disclosure.

FIGS. 6 and 7 present alternative flowcharts 600 and 700, respectively, of the processes illustrated in FIGS. 2-4. Whereas flowcharts 200, 300, and 400 present the processes as if in a polling fashion (i.e. where the system checks for conditions), flowcharts 600 and 700 present the processes in an interrupt fashion (i.e. where changing conditions interrupt a normal operation). In other words, the processes of flowcharts 200, 300, and 400 may be running concurrently or overlap, which flowcharts 600 and 700 further illustrate.

In FIG. 6, the flowchart 600 begins at 610, where a time out from loading a BIOS from the main BIOS 120 starts the failover process. At 620, the BMC 110 determines whether the CPU 150 is off. If the CPU 150 is off, then the process ends. Otherwise, at 630, the BMC 110 determines whether the BIOS was loaded successfully, similar to 230 in FIG. 2 described above. If the BIOS loaded successfully, the process continues at 650. Otherwise, at 640, the BMC 110 switches to the backup BIOS 130, similar to 250 in FIG. 2. At 650, the counters are reset before ending the process.

In FIG. 7, the flowchart 700 begins at 710, where a CPU reset signal, such as the SLP_S3 signal, is asserted, similar to 210 in FIG. 2. At 720, the reset counter is incremented, similar to 354 in FIG. 3. At 730, the BMC 110 determines whether the reset threshold is met, similar to 360 in FIG. 3. If the reset threshold is not met, at 740 the watchdog timer is started, similar to 352 in FIG. 3, and the process ends.

If the reset threshold is met, then at 750 the BMC 110 determines whether the main BIOS 120 is in use, analogous to 410 in FIG. 4 checking for the backup BIOS 130. If the main BIOS 120 is not in use, i.e. the backup BIOS 130 is in use, then at 760 the peripheral reset hold signal is asserted, similar to 430 in FIG. 4. Otherwise, at 770, the BMC 110 switches to the backup BIOS 130, similar to 370 in FIG. 3. At 780, the counters are reset before ending the process.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

The invention claimed is:

1. A motherboard comprising:
   a first basic input/output system (BIOS) chip for storing a first BIOS image;
   a second BIOS chip for storing a second BIOS image;
   a processor;
   a peripheral bus for communicating with a peripheral device; and
   a controller configured to control communication with the first and second BIOS chips, wherein the controller is further configured to:
   determine whether the first BIOS image loaded successfully from the first BIOS chip; and
   when the first BIOS image fails to load successfully:
   switch from loading the first BIOS image from the first BIOS chip to loading the second BIOS image from the second BIOS chip;
   determine whether the second BIOS image loaded successfully; and
   prevent the peripheral bus from resetting if the second BIOS image failed to load successfully.

2. The motherboard of claim 1, further comprising a platform controller hub (PCH) in communication with the processor and configured to reset the processor when a timer expires after a predetermined time corresponding to a time to complete loading the first BIOS image from the first BIOS chip.

3. The motherboard of claim 1, wherein the controller is further configured to allow communication with the second BIOS chip when the first BIOS chip is unavailable.

4. The motherboard of claim 1,
   wherein the controller is further configured to
   prevent the peripheral bus from resetting by asserting a peripheral reset hold signal.

5. The motherboard of claim 1, wherein the processor is configured to:
   after the first BIOS image failed to load successfully:
   determine whether the second BIOS chip is in use;

obtain a third BIOS image from a confirmed external source; and
reflash the first BIOS chip with the third BIOS image when the second BIOS chip is determined to be in use.

6. The motherboard of claim 1, wherein the processor is configured to:
after the first BIOS image failed to load successfully:
determine whether the second BIOS chip is in use; and
reflash the first BIOS chip with the second BIOS image when the second BIOS chip is determined to be in use.

7. The motherboard of claim 1, wherein the second BIOS chip is further configured to store backup data values for data values stored in the first BIOS chip and the processor is configured to restore the backup data values from the second BIOS chip to the first BIOS chip.

8. A motherboard comprising:
a first basic input/output system (BIOS) chip for storing a first BIOS image;
a second BIOS chip for storing a second BIOS image;
a platform controller hub (PCH);
a peripheral bus connected to the PCH for communicating with a peripheral device;
a processor in communication with the PCH; and
a controller configured to control communication between the PCH and the first and second BIOS chips, wherein the controller is further configured to:
determine whether the first BIOS image loaded successfully; and
when the first BIOS image fails to load successfully:
switch from loading the first BIOS image from the first BIOS chip to loading the second BIOS image from the second BIOS chip;
determine whether the second BIOS image loaded successfully; and
prevent the peripheral bus from resetting if the second BIOS image failed to load successfully.

9. The motherboard of claim 8, wherein the controller is further configured to:
maintain a counter corresponding to a number of times the PCH performs a reset of the processor; and
determine whether the first BIOS image loaded successfully by comparing a counter value with a reset threshold.

10. The motherboard of claim 8, wherein the controller is further configured to maintain a counter corresponding to a number of times the PCH performs a reset of the processor, and wherein the counter is configured to start at a reset threshold and decrement each time the PCH performs the reset of the processor such that reaching 0 indicates that the first BIOS image failed to load successfully.

11. The motherboard of claim 8, wherein the controller is further configured to allow the PCH to communicate with the second BIOS chip when the first BIOS chip is unavailable.

12. The motherboard of claim 8, wherein the controller is further configured to
prevent the peripheral bus from resetting by asserting a peripheral reset hold signal.

13. The motherboard of claim 8, wherein the processor is configured to:
after the first BIOS image failed to load successfully:
determine whether the second BIOS chip is in use; and
reflash the first BIOS chip with a third BIOS image when the second BIOS chip is determined to be in use.

14. The motherboard of claim 8, wherein the processor is configured to:
after the first BIOS image failed to load successfully:
determine whether the second BIOS chip is in use; and
reflash the first BIOS chip with the second BIOS image when the second BIOS chip is determined to be in use.

15. The motherboard of claim 8, wherein the second BIOS chip is further configured to store backup data values for data values stored in the first BIOS chip and the processor is configured to restore the backup data values from the second BIOS chip to the first BIOS chip.

16. A method for a basic input/output system (BIOS) failover comprising:
initiating loading of a first BIOS image from a first BIOS chip;
determining whether the first BIOS image loaded successfully; and
when the first BIOS image fails to load successfully:
switching to loading a second BIOS image from a second BIOS chip;
determining whether the second BIOS image loaded successfully; and
preventing a peripheral bus from resetting if the second BIOS image failed to load successfully.

17. The method of claim 16, wherein determining whether the first BIOS image loaded successfully includes determining whether a predetermined point has been reached in executing the first BIOS image before loading an operating system (OS) or performing a self-check on code sections in the first BIOS image.

18. The method of claim 16, wherein determining whether the first BIOS image loaded successfully includes detecting a signal indicating the first BIOS image loaded successfully.

19. The method of claim 16, further comprising preventing the peripheral bus from resetting by asserting a peripheral reset hold signal.

20. The method of claim 16, further comprising:
after the first BIOS image failed to load successfully:
determining whether the second BIOS chip is in use;
obtaining a third BIOS image from a confirmed external source; and
reflashing the first BIOS chip with the third BIOS image when the second BIOS chip is determined to be in use.

21. The method of claim 16, further comprising:
after the first BIOS image failed to load successfully:
determining whether the second BIOS chip is in use; and
reflashing the first BIOS chip with the second BIOS image when the second BIOS chip is determined to be in use.

22. The method of claim 16, further comprising restoring backup data values from the second BIOS chip to the first BIOS chip.

23. The method of claim 16, further comprising:
saving data values from the first BIOS chip; and
restoring the data values to the first BIOS chip after reflashing the first BIOS chip.

24. The method of claim 16, further comprising reflashing the first BIOS chip without writing over data values stored in the first BIOS chip to preserve the data values.

25. A method for a basic input/output system (BIOS) failover comprising:
initiating loading of a first BIOS image from a first BIOS chip;

determining whether the first BIOS image is corrupted; and when the first BIOS image is corrupted:
- switching to loading a second BIOS image from a second BIOS chip;
- determining whether the second BIOS image loaded successfully; and
- preventing a peripheral bus from resetting if the second BIOS image failed to load successfully.

26. The method of claim 25, further comprising:

configuring a timer based on a predetermined time corresponding to a time to complete loading the first BIOS image;

determining, based on the timer, whether the first BIOS image loaded successfully; and resetting the processor when the first BIOS image fails to load successfully.

* * * * *